July 5, 1949.    J. M. HAIT    2,475,496
AMPHIBIAN
Filed Feb. 15, 1943    2 Sheets-Sheet 1
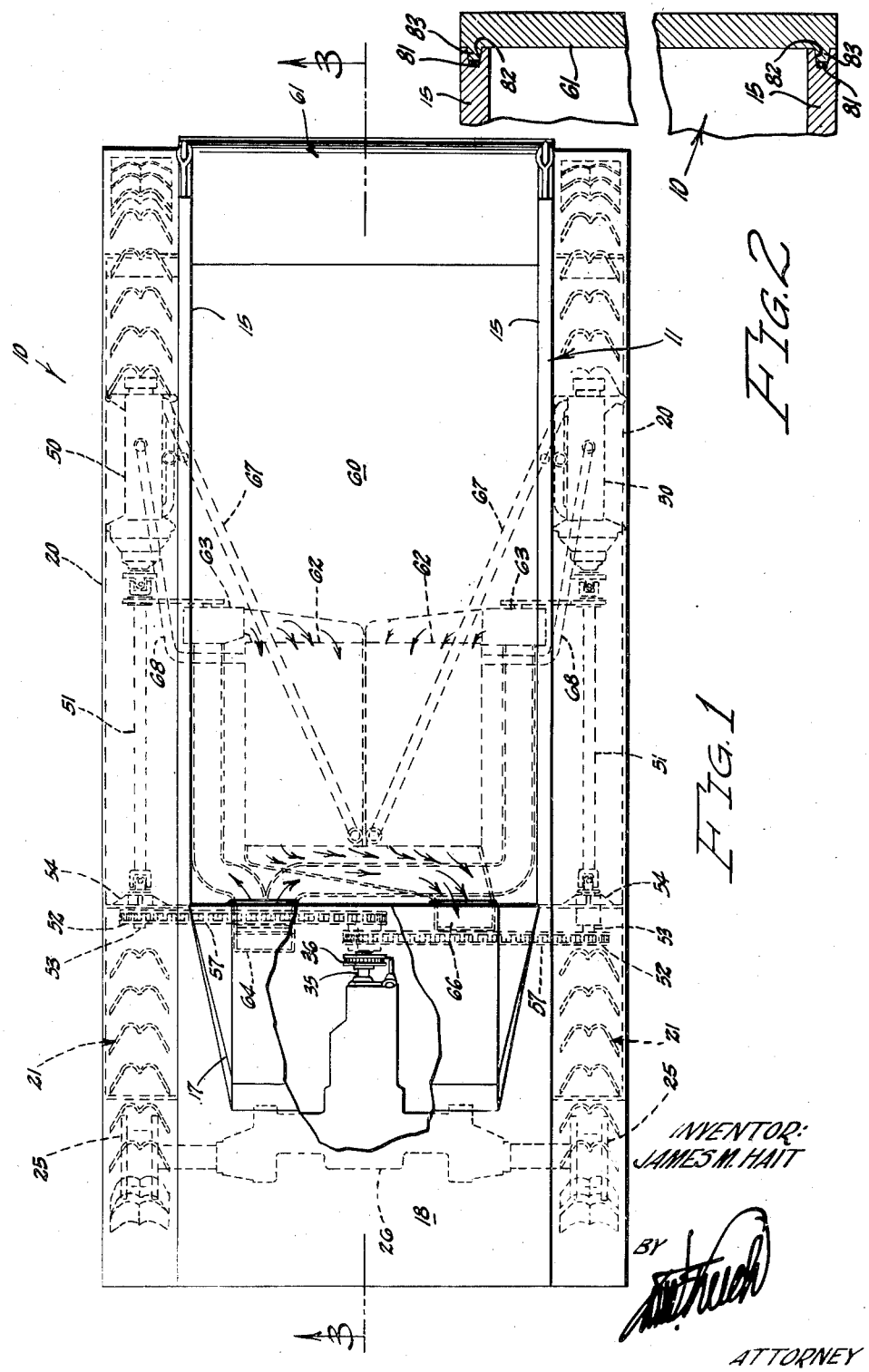

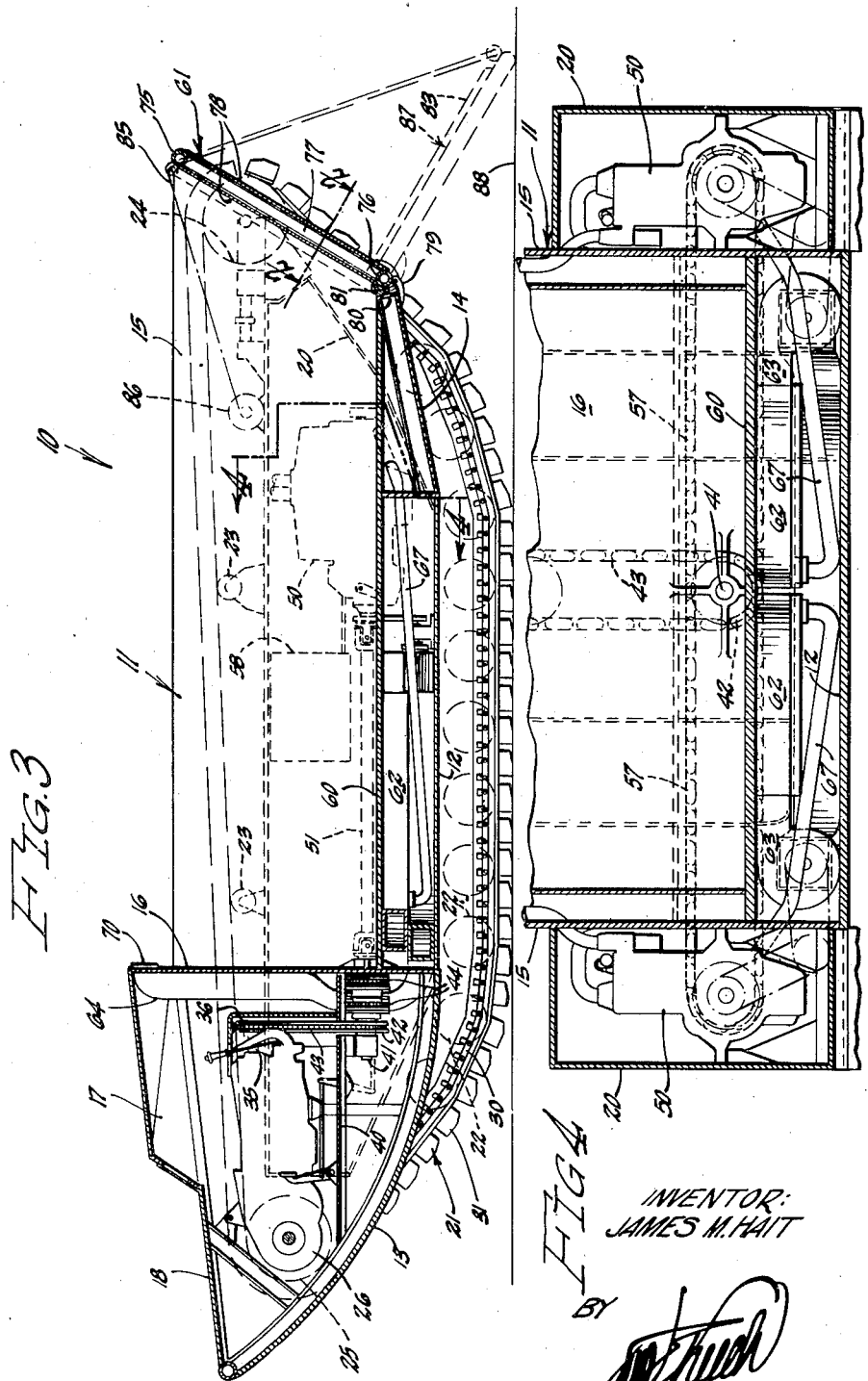

Patented July 5, 1949

2,475,496

UNITED STATES PATENT OFFICE 2,475,496

AMPHIBIAN

James M. Hait, San Gabriel, Calif., assignor to Food Machinery and Chemical Corporation, a corporation of Delaware Application February 15, 1943, Serial No. 475,933

2 Claims. (Cl. 115—1)

This invention relates to amphibians, and has particular utility in cargo-carrying amphibians employed in amphibious naval warfare.

Amphibians provided for this purpose have track-laying belts mounted on opposite sides thereof, and must be relatively short to permit them to turn readily by differential driving of these belts. The cargo-carrying compartment in the ship must therefore be fairly deep with its floor well below the water level to accommodate the load they are designed to carry. Access to the cargo compartment in the loading or unloading of cargo, is had by lifting the cargo over the topside, and this constitutes a serious drawback where heavy pieces of cargo are carried, as it requires a large force of men or special equipment to accomplish the loading or unloading of the ship.

Another serious handicap inherent in this design is found in the hazards to which soldiers carried by the amphibian are subjected when they have to climb over the topside in the face of enemy fire, either to enter or leave the amphibian.

It is an object of my invention to provide an amphibian onto which cargo may be loaded and from which it may be unloaded without passing over the topside of the ship.

Contrary to amphibians, the common design of landing boats is to make these relatively long and shallow, with their deck disposed above the water level, and provide an end door which may be lowered onto the beach to serve as a ramp over which men and cargo, including wheeled vehicles, may be transferred from the deck onto the beach, or vice versa. However, amphibian designers have heretofore been bound by certain prejudices which prevented the conception of an amphibian being equipped with any such door.

For an amphibian to be well balanced in the water, either when loaded or light, it is necessary that the heavier elements of the equipment, such as the engine, transmission, control cabin, and fuel tanks, be distributed about the ship in balancing relation with the center of buoyancy. It has become accepted as an unavoidable necessity, therefore, to occupy and block each end of the ship with one or more of these heavier equipment items. As the track-laying mechanisms are mounted on the side walls of the ship, no way has been apparent of providing a door in a hull wall of the amphibian for introducing cargo into or unloading it from the cargo compartment of the ship.

It is a further object of my invention to provide an amphibian in which the heavier items of equipment are so disposed as to give the amphibian good balance in the water when traveling loaded or light, and at the same time leave one end of the amphibian free for the installation of a door therein.

The manner of accomplishing the foregoing objects, as well as further objects and advantages, will be made manifest in the following description taken in connection with the accompanying drawings, in which:

Fig. 1 is a diagrammatic plan view of a preferred embodiment of the invention.

Fig. 2 is a diagrammatic fragmentary sectional view taken on line 2—2 of Fig. 3.

Fig. 3 is a longitudinal sectional view taken on line 3—3 of Fig. 1.

Fig. 4 is an enlarged fragmentary cross sectional view taken on the line 4—4 of Fig. 3 and showing the mounting of the motors of the amphibian in the pontoons thereof.

Referring specifically to the drawing, the amphibian 10 shown therein includes a hull 11 having a central bottom plate 12, an arcuate bow bottom plate 13; a sloping stern bottom plate 14; side walls 15; a bulkhead 16; a stationary turret 17; and a forward deck 18.

Built integrally with each of the side walls 15 is a pontoon 20. Mounted about each pontoon 20 is a track-laying belt mechanism 21, which includes a series of bogie wheels 22 provided along the lower edge of the pontoon, a pair of idler rollers 23 mounted on top of the pontoon, an idler sprocket 24 mounted on the rear upper corner of the pontoon, a drive sprocket 25 mounted on one end of a transmission 26 provided in the front end of the hull, and a track-laying belt 30 which is trained about the sprockets 24 and 25, rollers 23 and bogie wheels 22. This belt has a series of grousers 31 for engaging the ground when the amphibian 10 is operating on land, and for engaging the water when the amphibian is afloat, whereby the amphibian is propelled through the water when the track-laying belts 30 are actuated.

The transmission 26 has a high speed shaft 35 carrying a sprocket 36, through which power is adapted to be delivered to the transmission, the latter being controllable to utilize this power to drive the track-laying belts 30 forwardly at different speeds or to drive these in reverse. Some of the levers for controlling this transmission are shown, but it is unnecessary to illustrate or describe the controls for this transmission as these are well understood in the art.

Journalled in suitable bearings provided on the bulkhead 16 and auxiliary frame 40 is a countershaft 41 having a sprocket 42 which connects by a chain 43 to the sprocket 36, which is located directly thereabove. The shaft 41 also carries free wheeling sprockets 44.

The amphibian 10 preferably has two internal combustion engines 50, one of which is installed in each of the pontoons 20, each engine being connected by a drive shaft 51 to a sprocket 52 on a shaft 53 which journals in a bearing 54 provided in a forward portion of the pontoons 20. The sprockets 52 are connected to the sprockets 42 by chains 57.

A supply of gasoline for the engine 50 in each pontoon may be furnished from a tank 58 mounted in that pontoon opposite the center of gravity of the craft.

The hull 11 provides a cargo well which is formed by the side walls 15, the bulkhead 16, a floor 60 and an end door 61.

Located in the space between the floor 60 and the hull bottom 12 are radiators 62, for cooling the engines 50. Blowers 63 are also located in this space and driven by the respective engines 50 to suck air in through a conduit 64, draw this air through the radiator 62 and discharge this air through a conduit 66. The radiators 62 are connected to the cooling jackets on the engines 50 by water pipes 67 and 68. As clearly shown in Figs. 1 and 3, the upper ends of the conduits 64 and 65 connect with the atmosphere through openings 70 formed in the upper outer edges of the wall 16. Thus, even though the surf may be splashing somewhat over the bow of the craft, this will not interfere with the operation of the air circulating system for keeping the radiators 62 cool.

In order to have access to the engines 50 for tuning these and repairing the same, suitable doors or removable panels (not shown) may be provided in the walls 15 or in the other walls of the pontoons 20, or in both.

The door 61 is preferably strongly constructed as shown in Fig. 1, with upper and lower tubular stringers 75 and 76, which are united by channels or I-beams 77 and covered outside and inside by metal sheeting 78. The lower stringer 76 is secured by suitable hinges 79 to a cross channel member 80 provided on the hull 11. A suitable strip 81 of resilient material, such as rubber, is provided to make a water-tight joint between the bottom and side edges of the door 61 and the hull 11 when this door is closed. Along the side walls, the strip 81 lies in the bottom of grooves 82 into which tongues 83, formed in the door 61, extend when this door is closed. Not only does this form a water-tight joint between the door and the hull but it integrates the side walls with the door when the latter is closed.

Cables 85 connect outer upper corners of the door 61 to winches 86, which are operated either electrically or by hand, as desired, so as to lower and raise the door 61 as indicated in Fig. 1. When this door is lowered into its dotted line position 87, it forms a ramp leading practically from the level of floor 60 to the level of the ground 88, on which the amphibian is shown as resting.

From the foregoing it is seen that I have provided a practical solution for the problem of loading and unloading cargo and personnel from an amphibian while operating this amphibian in amphibious naval warfare. The division of the power plant into two engines 50 and the location of these individually in the pontoons 20, makes possible the distribution of the weight of the power plant control cabin and transmission about the center of buoyancy of the craft so that the craft will have good seaworthy characteristics when traveling empty of cargo, thereby making practical the installation of a door in one end of the hull.

I claim:

1. An amphibian comprising: a hull; two pontoons one of which is provided on each side of said hull; two track-laying belts, one of which is mounted about each of said pontoons; a pair of engines for driving said belts, each of said pontoons having one of said engines mounted therein; means for transmitting power from said engines to said belts; means forming a cargo well in said hull, said means including a floor; and apparatus disposed between the bottom of said hull and said floor for cooling said engines.

2. An amphibian comprising: a hull; two pontoons, one of which is provided on each side of said hull; two track-laying belts, one of which is mounted on each of said pontoons; a pair of engines for driving said belts, each of said pontoons having one of said engines mounted therein; means for transmitting power from said engines to said belts; means forming a cargo well in said hull, said means including a floor; apparatus disposed between the bottom of said hull and said floor for cooling said engines; and a door in one end of said hull for loading and unloading cargo.

JAMES M. HAIT.

REFERENCES CITED

The following references are of record in the file of this patent:

UNITED STATES PATENTS

| Number | Name | Date |
|---|---|---|
| 1,317,103 | Rimailho | Sept. 23, 1919 |
| 1,696,439 | Knox | Dec. 25, 1928 |
| 1,853,357 | Howe | Apr. 12, 1932 |
| 2,138,207 | Roebling | Nov. 29, 1938 |
| 2,223,885 | Powell | Dec. 3, 1940 |